No. 706,894. Patented Aug. 12, 1902.
C. A. BRINLEY.
SHEET METAL PULLEY.
(Application filed Mar. 22, 1902.)
(No Model.)
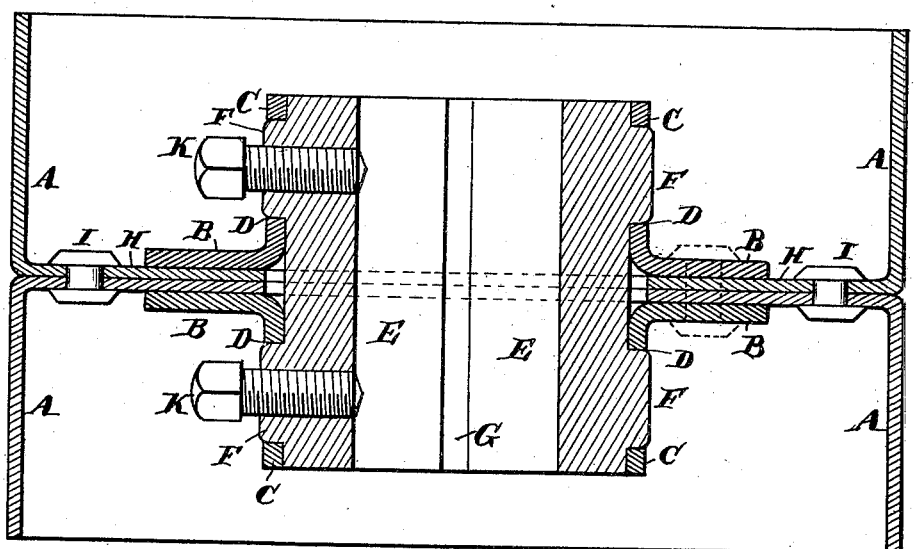
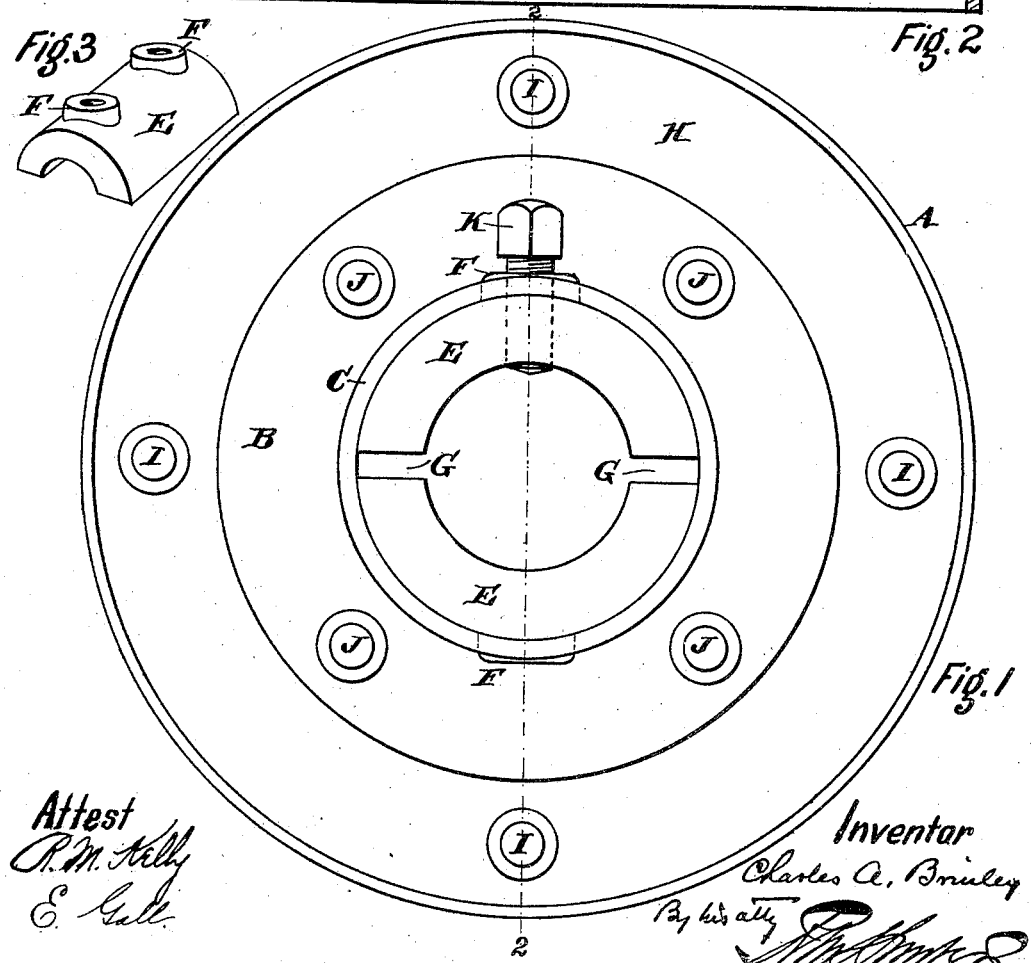
Attest
R. M. Kelly
E. Gall
Inventor
Charles A. Brinley
By his atty

UNITED STATES PATENT OFFICE.

CHARLES A. BRINLEY, OF PHILADELPHIA, PENNSYLVANIA, ASSIGNOR TO THE AMERICAN PULLEY COMPANY, A CORPORATION OF PENNSYLVANIA.

SHEET-METAL PULLEY.

SPECIFICATION forming part of Letters Patent No. 706,894, dated August 12, 1902.

Application filed March 22, 1902. Serial No. 99,394. (No model.)

*To all whom it may concern:*

Be it known that I, CHARLES A. BRINLEY, of the city and county of Philadelphia, State of Pennsylvania, have invented an Improvement in Sheet-Metal Pulleys, of which the following is a specification.

My invention has reference to sheet-metal pulleys; and it consists of certain improvements, all of which are fully set forth in the following specification and shown in the accompanying drawings, which form a part thereof.

The object of my invention is to provide a suitable construction of pulley capable of adaptation from sheet metal, except as to the bearing for attachment upon the shaft, which shall be strong, durable, and cheap to manufacture.

In carrying out my invention I form the band-rim of the pulley of two tubular sections having inward flanges which are riveted together to form a web. I also provide two circular hub portions having outwardly-directed flanges which are abutted upon the outer surfaces of the web and secured thereto. Within the hub so formed I prefer to place two forged or cast-metal portions constituting hub-blocks to fit upon the shaft, they being made to engage with the hub, so as to positively rotate it, or vice versa, the said blocks together being of less circumferential length than the internal circumferential length of the hub, whereby they may be inserted in position through the hub, and to which they are locked when the shaft is inserted between the blocks.

My invention also comprehends details of construction which, together with the above features, are more fully pointed out in the claims and will be better understood by reference to the drawings, in which—

Figure 1 is an end elevation of a pulley embodying my invention. Fig. 2 is a cross-section of same on line 2 2, and Fig. 3 is a perspective view of one of the hub-blocks removed.

The band or outer rim of the wheel is made of two circular parts A A, having inward flanges H butted together in a central plane and riveted at I, whereby is produced a rim T-shaped in cross-section. The flange H is preferably of a depth equal to the distance between the band-rim and hub of the wheel to constitute a web of great strength. Secured to the inner part of the flange H and upon each side of it I arrange annular hub-plates of L shape in cross-section, said plates comprising the radial flange B and the annular hub-rim C. One of these hub-plates is placed upon each side of the web H and secured to it by rivets J, preferably staggered with reference to the rivets I. The structure so formed is, in effect, a pulley having upon each side two annular flanges or rims separated by an annular recess and in which the web is of two thicknesses of metal near the rim and four thicknesses near the hub. The circular hub-rims C are perforated at D D on opposite sides, so that there are preferably four such apertures in the hub portion. The interior of the hub portion is fitted with removable hub-blocks E E of semicircular cross-section and having an outer curvature to fit the internal curvature of the hub-rim C. These blocks are provided with protuberances or bosses F, which fit into or through the apertures D of the hub-rims and are thereby held against rotary or longitudinal movement within the hub-rim and relatively thereto. These blocks E E are bored out to fit the shaft to which the pulley is to be attached. Set-screws K are preferably carried by at least one of the blocks E and passed through the bosses F for clamping the pulley upon the shaft. To enable the blocks E E to be inserted into position, they must be somewhat less than semicylindrical, so as to leave a space G between them which is equal at least to the height of the bosses through the apertures D, measuring from the internal surface of the hub-rim C. It is evident that if desired a key or keys on the shaft may be received between these blocks in the opening G and act as a positive means of connection; but this forms no part of the pulley structure.

It is evident that it is not necessary that the apertures D and lugs or bosses F shall be made of the form or shape shown, as any shape or form of irregularity may be employed so long as they interengage and one part may positively drive the other. For example, the portions of the hub-rims C outside of the center of the set-screws K may be omitted, as in that case I would still have the necessary interengagement of the bosses with the notches still remaining in the rim. It is also evident that while rivets are most desirable bolts may be substituted therefor.

While I prefer the construction shown, I do not limit myself to the minor details, as these may be modified without departing from the spirit of the invention.

Having now described my invention, what I claim as new, and desire to secure by Letters Patent, is—

1. A sheet-metal pulley composed of two sheet-metal halves secured together by their webs and each consisting of a circular band-rim, a circular hub-rim, a web connecting them of single thickness adjacent to the band-rim and double thickness adjacent to the hub-rim, there being an annular space between the rims, in combination with two substantially semicircular hub-blocks fitted to the interior of the hub-rims for connecting it with a shaft.

2. A sheet-metal pulley composed of two sheet-metal halves secured together by their webs and each consisting of a circular band-rim, a circular hub-rim, a web connecting them, there being an annular space between the rims, in combination with two substantially semicircular hub-blocks fitted to the interior of the hub-rims by projecting lugs or bosses extending into perforated or recessed portions of the hub-rims whereby they are held together against independent movement, said blocks being adapted for connecting it with a shaft.

3. A sheet-metal pulley composed of two sheet-metal halves secured together by their webs and each consisting of a circular band-rim, a circular hub-rim, a web connecting them, there being an annular space between the rims, in combination with two substantially semicircular hub-blocks fitted to the interior of the hub-rims by projecting lugs or bosses extending into perforated or recessed portions of the hub-rims whereby they are held together against independent movement said blocks being adapted for connecting the pulley with a shaft, and clamping-screws extending through the hub-blocks and projecting outwardly beyond the hub-rims.

4. In a sheet-metal pulley, the combination of the circular outer or band-rim sections A A having the radial flanges H directed inward almost to the hub and riveted together close to the rim, and the circular hub-rims C C having the circular radial flanges B fitting upon the outside of the flanges H and riveted upon them close to the hub to constitute a strong web.

5. In a sheet-metal pulley, the combination of the circular outer or band-rim sections A A having the radial flanges H directed inward almost to the hub and riveted together close to the rim, the circular hub-rims C C having the circular radial flanges B fitting upon the outside of the flanges H and riveted upon them adjacent to the hub to constitute a strong web, and internal hub-blocks E E fitted to the interior of the hub-rims and held therein against rotation.

6. In a sheet-metal pulley, the combination of the outer or band-rim sections A A having the radial flanges H riveted together, the hub-rims C C having the radial flanges B and apertures D fitting upon the outside of the flanges H and riveted upon them to constitute a strong web and internal hub-blocks E E fitted to the interior of the hub-rims and held therein against rotation by lugs or bosses F extending outwardly through the apertures.

7. In a sheet-metal pulley, the combination of the outer or band-rim sections A A having the radial flanges H riveted together, the hub-rims C C having apertures D and the radial flanges B fitting upon the outside of the flanges H and riveted upon them to constitute a strong web, internal hub-blocks E E fitted to the interior of the hub-rims and held therein against rotation by lugs or bosses F extending outwardly through the apertures, and clamping-screws K extending through the lugs or bosses.

8. A pulley provided with a radial web having two hub-rims formed each with one or more portions opening from their interior surfaces, in combination with hub-blocks fitting into said hub-rims each less than semicylinder and having projecting portions or bosses to fit into the inverse portions of the rims, whereby said blocks may be inserted in position and held against rotation independent of the pulley.

9. A pulley having a tubular hub of fixed shape, in combination with two substantially semicylindrical removable hub-blocks to receive the shaft and fit upon the internal surface of the pulley-hub and having their outer surfaces at one or more places formed with projections, and received upon or in corresponding inverse portions of the tubular hub.

10. A pulley having a tubular hub of fixed shape, in combination with two substantially semicylindrical removable hub-blocks to receive the shaft and fit upon the internal surface of the pulley-hub and having their outer surfaces at one or more places formed with projections, and received upon or in corresponding inverse portions of the tubular hub, and clamping-screws extending through the hub and carried by the hub-blocks.

In testimony of which invention I have hereunto set my hand.

CHARLES A. BRINLEY.

Witnesses:
R. M. HUNTER,
J. W. KENWORTHY.